United States Patent
Ishii et al.

(10) Patent No.: US 9,185,633 B2
(45) Date of Patent: *Nov. 10, 2015

(54) RADIO BASE STATION, MOBILE STATION, MOBILE COMMUNCATION METHOD FOR IMPROVING POSITIONING REFERENCE SIGNAL RECEPTION PROCESSING TIME IN THE MOBILE STATION

(75) Inventors: Minami Ishii, Yokohama (JP); Sadayuki Abeta, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 13/391,944

(22) PCT Filed: Aug. 27, 2010

(86) PCT No.: PCT/JP2010/064560
§ 371 (c)(1),
(2), (4) Date: Feb. 23, 2012

(87) PCT Pub. No.: WO2011/024937
PCT Pub. Date: Mar. 3, 2011

(65) Prior Publication Data
US 2012/0147796 A1    Jun. 14, 2012

(30) Foreign Application Priority Data

Aug. 27, 2009    (JP) .................................. 2009-197469

(51) Int. Cl.
*H04J 1/00*      (2006.01)
*H04W 48/08*   (2009.01)
*H04W 56/00*   (2009.01)
*H04W 24/10*   (2009.01)

(52) U.S. Cl.
CPC .......... *H04W 48/08* (2013.01); *H04W 56/0065* (2013.01); *H04W 24/10* (2013.01)

(58) Field of Classification Search
USPC ......... 370/221, 252, 328, 331, 336, 344, 350, 370/503; 455/226.1, 434, 456.1, 509
See application file for complete search history.

(56) References Cited

U.S. PATENT DOCUMENTS

| | | | |
|---|---|---|---|
| 7,940,740 B2 * | 5/2011 | Krishnamurthy et al. | .... 370/344 |
| 2004/0131029 A1 * | 7/2004 | Tobe et al. | ..................... 370/331 |
| 2004/0151143 A1 * | 8/2004 | Abdesselem et al. | ......... 370/336 |
| 2005/0032542 A1 * | 2/2005 | Wilborn et al. | ............... 455/525 |

(Continued)

FOREIGN PATENT DOCUMENTS

| | | |
|---|---|---|
| CN | 101018221 A | 8/2007 |
| JP | 2008-124832 A | 5/2008 |

(Continued)

OTHER PUBLICATIONS

International Search Report w/translation from PCT/JP2010/064560 dated Nov. 30, 2010 (3 pages).

(Continued)

*Primary Examiner* — Gregory Sefcheck
*Assistant Examiner* — Jael Ulysse
(74) *Attorney, Agent, or Firm* — Osha Liang LLP

(57) ABSTRACT

A radio base station that includes an upper-layer information transmission unit configured to transmit a length of Cyclic Prefix (CP) used in neighboring cells and a Positioning Reference Signal (PRS) transmission unit configured to transmit the PRS generated based on the length of CP, in a subordinate cell included in the neighboring cells.

3 Claims, 3 Drawing Sheets

(56) References Cited

U.S. PATENT DOCUMENTS

| | | | |
|---|---|---|---|
| 2005/0123138 A1* | 6/2005 | Abe et al. | 380/255 |
| 2007/0097928 A1* | 5/2007 | Anderson | 370/335 |
| 2007/0149206 A1* | 6/2007 | Wang et al. | 455/450 |
| 2007/0167160 A1* | 7/2007 | Asanuma et al. | 455/434 |
| 2008/0101306 A1* | 5/2008 | Bertrand et al. | 370/336 |
| 2008/0240281 A1* | 10/2008 | Gaal et al. | 375/267 |
| 2008/0316961 A1* | 12/2008 | Bertrand et al. | 370/329 |
| 2009/0016268 A1* | 1/2009 | Yi et al. | 370/328 |
| 2009/0116473 A1* | 5/2009 | Lindoff et al. | 370/350 |
| 2009/0117896 A1* | 5/2009 | Baldemair et al. | 455/434 |
| 2009/0201801 A1* | 8/2009 | Ono | 370/221 |
| 2009/0312008 A1* | 12/2009 | Lindoff et al. | 455/423 |
| 2010/0029262 A1* | 2/2010 | Wang et al. | 455/423 |
| 2010/0069066 A1* | 3/2010 | Shen et al. | 455/434 |
| 2010/0195566 A1* | 8/2010 | Krishnamurthy et al. | 370/328 |
| 2010/0260154 A1* | 10/2010 | Frank et al. | 370/336 |
| 2010/0265968 A1* | 10/2010 | Baldemair et al. | 370/503 |
| 2010/0273506 A1* | 10/2010 | Stern-Berkowitz et al. | 455/456.1 |
| 2011/0032850 A1* | 2/2011 | Cai | 370/280 |
| 2011/0039580 A1* | 2/2011 | Wigren et al. | 455/456.1 |
| 2011/0158164 A1* | 6/2011 | Palanki et al. | 370/328 |
| 2011/0195684 A1* | 8/2011 | Zhang et al. | 455/226.1 |
| 2011/0286349 A1* | 11/2011 | Tee et al. | 370/252 |
| 2012/0099453 A1* | 4/2012 | Sagfors et al. | 370/252 |
| 2012/0190393 A1* | 7/2012 | Ishii et al. | 455/509 |
| 2013/0023285 A1* | 1/2013 | Markhovsky et al. | 455/456.1 |

FOREIGN PATENT DOCUMENTS

| | | | | |
|---|---|---|---|---|
| WO | 2008/050388 A1 | 5/2008 | | |
| WO | 2008/127185 A1 | 10/2008 | | |
| WO | WO 2008127185 A1 * | 10/2008 | | H04W 48/12 |

OTHER PUBLICATIONS

3GPP TSG RAN WG1 Meeting #57bis, R1-092731; "Remaining issues on OTDOA positioning"; Ericsson; Los Angeles, USA; Jun. 29-Jul. 3, 2009 (5 pages).

3GPP TSG-RAN WG1 Meeting #57bis, R1-092854; "Draft CR 36.211 Introduction of LTE positioning"; Ericsson et al.; Los Angeles, USA; Jun. 29-Jul. 3, 2009 (5 pages).

3GPP TSG RAN WG1 Meeting #56bis, R1-091663; "[Draft] LS on Assistance data for OTDOA positioning"; Nokia Siemens Networks; Seoul, Korea; Mar. 23-27, 2009 (1 page).

Japanese Office Action w/English translation mailed on Nov. 30, 2010 in corresponding Japanese Application No. 2009-197469 (5 pages).

Japanese Office Action w/English translation mailed on Feb. 8, 2011 in corresponding Japanese Application No. 2009-197469 (5 pages).

Japanese Decision of Refusal of a Patent w/English translation mailed on Jun. 28, 2011 in corresponding Japanese Application No. 2009-197469 (4 pages).

Office Action issued in counterpart Chinese Patent Application No. 201080037624.0 dated Jan. 23, 2014 (17 pages).

Office Action issued Sep. 24, 2014 in corresponding Chinese Application No. 201080037624.0 (16 pages).

* cited by examiner (a)

NORMAL CP (b)

EXTENDED CP

▨ COMMON RS
▧ PRS
▦ PCFICH/PHICH/PDCCH
☐ NO TRANSMISSION

RADIO BASE STATION, MOBILE STATION, MOBILE COMMUNCATION METHOD FOR IMPROVING POSITIONING REFERENCE SIGNAL RECEPTION PROCESSING TIME IN THE MOBILE STATION

TECHNICAL FIELD

The present invention relates to a radio base station, a mobile station, and a measurement method.

BACKGROUND ART

In a standards determination work of an LTE (Long Term Evolution)-Rel.9 scheme, the introduction of PRS (Positioning Reference Signal) has been examined, which can be transmitted with a density higher than CRS (Common Reference Signal) in order for a mobile station UE to measure a propagation delay difference among a plurality of cells in LCS (Location Service).

However, in the current LTE-Rel. 9 scheme, a PRS transmission pattern is separately defined in the case where "Normal CP (Cyclic Prefix)" is used and the case where "Extended CP" is used.

Therefore, since a mobile station UE does not recognize which of the "Normal CP" or the "Extended CP" is used in a plurality of cells to be measured, it is necessary to detect PRS using both PRS transmission pattern for the "Normal CP" and a PRS transmission pattern for the "Extended CP", so that the configuration of the mobile station UE is complicated, resulting in an increase in a PRS reception processing time in the mobile station UE.

SUMMARY OF THE INVENTION

Therefore, the present invention has been achieved in view of the above-described problems, and an object thereof is to provide a radio base station capable of quickly receiving PRS without causing complication in the configuration of a mobile station UE, a mobile station, and a measurement method.

A first characteristic of the present invention is summarized as a radio base station comprising, a first transmission unit configured to transmit a length of a cyclic prefix used in a neighbouring cell, and a second transmission unit configured to transmit a reference signal in a subordinate cell, the reference signal being generated based on the length of the cyclic prefix.

A second characteristic of the present invention is summarized as a mobile station comprising, a first reception unit configured to receive a length of a cyclic prefix used in a number of a neighbouring cell, and a second reception unit configured to receive a reference signal in a number of a neighbouring cell, based on the length of the cyclic prefix.

A third characteristic of the present invention is summarized as a measurement method in which a mobile station measures a transmission delay difference between a serving cell of the mobile station and a neighbouring cell based on a reference signal received from a neighbouring cell, the measurement method comprising, a step of a radio base station transmitting a length of a cyclic prefix used in the neighbouring cell, cell ID assigned in the neighbouring cell and a transmission timing difference between the serving cell of the mobile station and the neighbouring cell a step of the radio base station transmitting a reference signal in a subordinate cell generated based on the cyclic prefix used in the subordinate cell when the subordinate cell is included in the neighbouring cell, a step of the mobile station receiving the reference signal transmitting by the neighbouring cell based on the length of a cyclic prefix, cell ID and transmission timing, a step of the mobile station measuring the propagation delay difference between the serving cell of the mobile station and the neighbouring cell based on the reference signal received from the neighbouring cell, and a step of the mobile station transmitting the measured propagation delay difference to the radio base station.

As described above, according to the present invention, it is possible to provide a radio base station capable of quickly receiving PRS without causing complication in the configuration of a mobile station UE, a mobile station, and a measurement method.

DETAILED DESCRIPTION (Configuration of Mobile Communication System According to First Embodiment of the Present Invention)

With reference to FIG. 1 to FIG. 4, the configuration of a mobile communication system according to a first embodiment of the present invention will be described.

Figure 1:
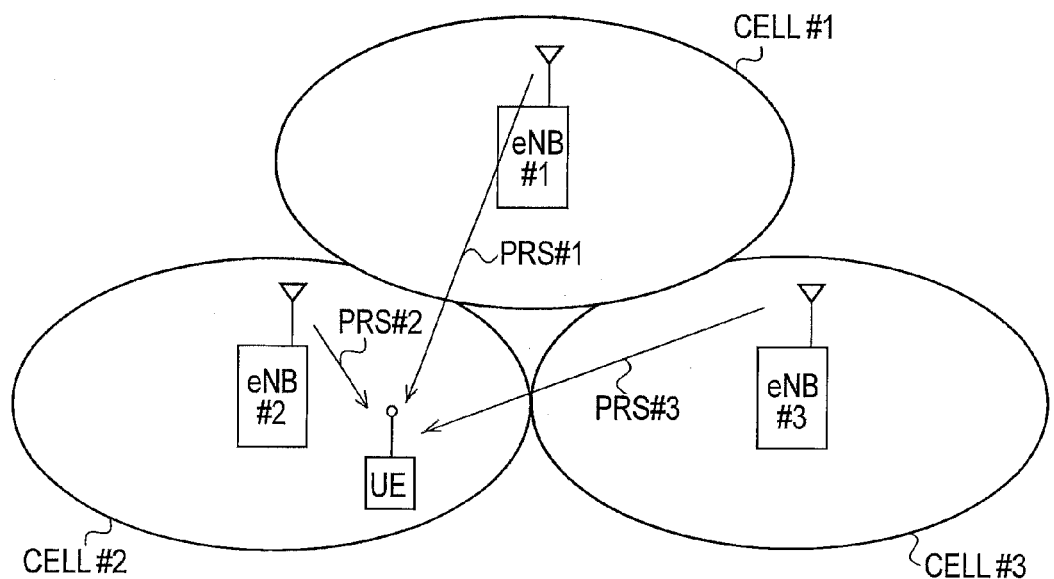
FIG. 1 is a diagram illustrating the entire configuration of a mobile communication system according to a first embodiment of the present invention.

A mobile communication system according to the present embodiment is a mobile communication system employing an LTE-Rel.9 scheme. The LTE-Rel. 9 scheme supports both frequency-division duplexing (FDD) as well as time division multiplexing (TDD). As illustrated in FIG. 1, in the mobile communication system according to the present embodiment, a mobile station UE is configured to receive PRSs #1 to #3 from a plurality of cells #1 to #3, respectively.

Furthermore, the mobile communication system according to the present embodiment is configured to use an "OTDOA (Observed Time Difference Of Arrival) scheme" as a positioning scheme when LCS is provided.

According to the OTDOA scheme, the mobile station UE is configured to measure a propagation delay difference among a plurality of cells designated by a radio base station eNB #2 and report a measurement result to the radio base station eNB #2, the radio base station eNB #2 is configured to transfer the report to E-SMLC (Evolved Serving Mobile Location Center), which is an upper node of radio base stations eNB #1 to eNB #3, and the E-SMLC is configured to calculate location information of the mobile station UE based on the propagation delay difference.

In the OTDOA scheme, it is possible to calculate the location information of the mobile station UE based on a propagation delay difference among three or more cells.

In the mobile communication system according to the present embodiment, as described above, since the propagation delay difference among a plurality of cells is used, it is preferable that synchronization is achieved among the cells. However, the synchronization may not be achieved among the cells.

In addition, in the present embodiment, a case will be described, in which the mobile station UE completes a connection to the cell #2 and visits the cell #2 and the radio base station eNB #2 allows the mobile station UE to measure the propagation delay difference among the cells #1 to #3 and to report the propagation delay difference to the radio base station eNB.

In addition, the cells #1 to #3 may be managed by the same radio base station eNB, or may be managed by the plurality of radio base stations eNB #1 to eNB #3 as illustrated in FIG. 1. Hereinafter, the present embodiment will be described on the assumption that the cells #1 to #3 are managed by the same radio base station eNB.

Figure 2:
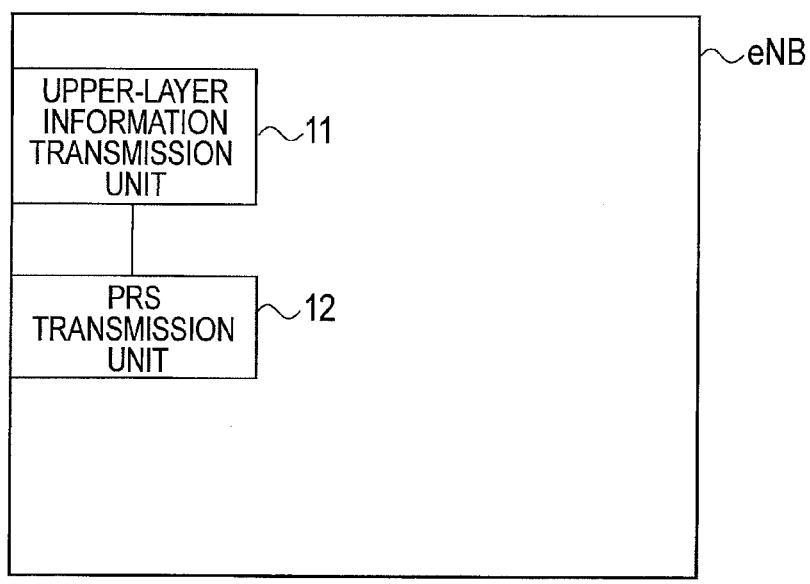
FIG. 2 is a functional block diagram of a radio base station according to the first embodiment of the present invention.
Figure 3:
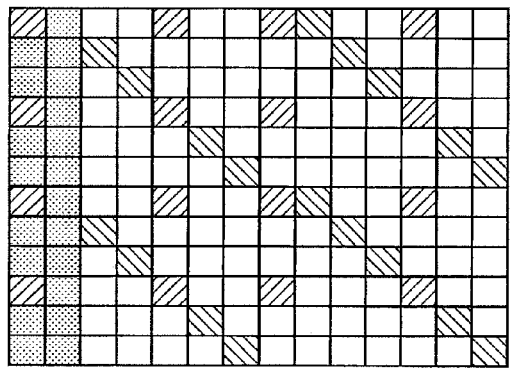
FIG. 3 is a diagram illustrating an example of PRS transmitted by the radio base station according to the first embodiment of the present invention.
Figure 3:
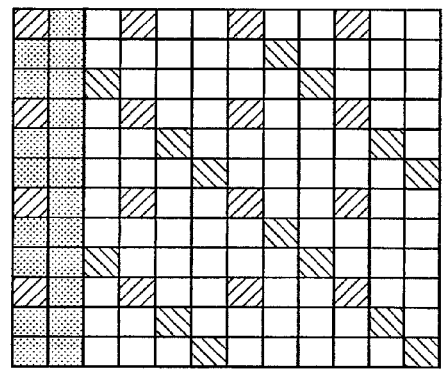

As illustrated in FIG. 2, the radio base station eNB includes an upper-layer information transmission unit 11 and a PRS transmission unit 12.

The upper-layer information transmission unit 11 is configured to transmit the lengths (CP lengths) of CPs used in neighbouring cells #1 to #3, cell IDs (for example, PCIs: Physical Cell IDs) assigned to the neighbouring cells #1 to #3, transmission timing differences among the neighbouring cells #1 to #3, and the like to the mobile station UE.

For example, the upper-layer information transmission unit 11 may be configured to transmit the lengths of the CPs used in the neighbouring cells #1 to #3, the cell IDs assigned to the neighbouring cells #1 to #3, the transmission timing differences among the neighbouring cells #1 to #3, and the like to the mobile station UE through an RRC message including broadcast information, mobile station UE-individual signaling, and the like.

When subordinate cells are included in neighbouring cells, the PRS transmission unit 12 is configured to generate and transmit PRSs based on the above-mentioned CP lengths in the subordinate cells #1 to #3 as follows.

Specifically, the PRS transmission unit 12 may also be configured to generate the sequence of the PRS by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{PRS} - 1$$

In Equation 1 above, the "$r_{l,ns}(m)$" denotes an m-th sample at an l-th OFDM symbol in a slot with a slot number ns. Furthermore, the "$N_{RB}^{PRS}$" denotes the number of resource blocks (RBs) for transmitting PRSs, and is a parameter included in the above-mentioned broadcast information. Furthermore, the c(m) is a random sequence and is initialized by Equation 2 below.

$$c_{init} = 2^{10} \cdot (7 \cdot (n_s + 1) + l + 1) \cdot (2 \cdot N_{ID}^{cell} + 1) + 2 \cdot N_{ID}^{cell} + N_{CP} \quad \text{[Equation 2]}$$

In Equation 2 above, the "$N_{ID}^{cell}$" denotes a cell ID assigned to each cell, and the "$N_{CP}$" denotes is a variable defined by Equation 3 below.

$$N_{CP} = \begin{cases} 1 & \text{for normal } CP \\ 0 & \text{for extended } CP \end{cases} \quad \text{[Equation 3]}$$

That is, as expressed by Equation 3 above, the value of the "$N_{CP}$" is configured to be changed by the length of the CP, that is, according to whether the "Normal CP" is used or the "Extended CP" is used.

Furthermore, as described above, the sequence of the PRS is uniquely configured to be determined by information on a cell such as a cell ID (PCI). For example, the range of a value assignable as the PCI may be "0 to 504".

Furthermore, the PRS transmission unit 12 is configured to allow sequences of the PRSs #1 to #3 generated as described above to be mapped to resource elements (REs).

For example, as illustrated in FIG. 3(a) and FIG. 3(b), the PRS transmission unit 12 may also be configured to allow the sequences of the PRSs to be mapped to each resource element in each resource block.

FIG. 3(a) illustrates a PRS transmission pattern when the "Normal CP" is used and FIG. 3(b) illustrates a PRS transmission pattern when the "Extended CP" is used.

Specifically, the PRS transmission unit 12 may also be configured to allow the sequences of the PRSs to be mapped to resource elements designed by Equation 4 below.

$$a_{k,l}^{(p)} = r_{l,n_s}(m') \quad \text{[Equation 4]}$$

In Equation 4 above, the "$a_{k,l}$" denotes a k-th sub-carrier and a symbol of a resource element at an l-th OFDM symbol. In addition, a sub-carrier k and an OFDM symbol index l are determined by Equation 5 below.

[Equation 5]
$$k = 6m + (6 - l + v_{shift}) \bmod 6$$
$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$
$$m = 0, 1, \ldots, 2 \cdot N_{RB}^{PRS} - 1$$
$$m' = m + N_{RB}^{max,DL} - N_{RB}^{PRS}$$
$$\left[ v_{shift} = \left( \sum_{i=0}^{7} 2_o^i \left(i + 8\left\lfloor \frac{n_s}{2} \right\rfloor\right) \right) \bmod 6 \right]$$
$$c_{init} = N_{Cell}^{ID}$$

Furthermore, the PRS transmission unit 12 is configured to transmit a resource block, to which the PRS has been mapped, in each cell.

In addition, the PRS transmission unit 12 is configured to be notified of a frequency bandwidth (the number of resource blocks) or a transmission interval (a transmission timing) for transmitting the PRS by an upper layer.

Furthermore, at a resource block for transmitting the PRS, the PRS transmission unit 12 may also be configured not to transmit a PDSCH (Physical Downlink Shared Channel) signal (a downlink data signal). As a consequence, it is possible to improve the accuracy of timing detection of the PRS.

Figure 4:
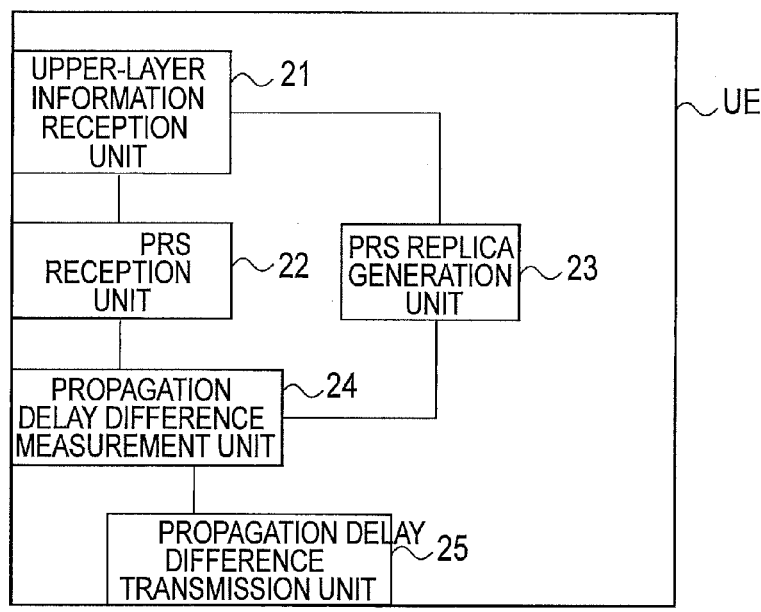
FIG. 4 is a functional block diagram of a mobile station according to the first embodiment of the present invention.

As illustrated in FIG. 4, the mobile station UE includes an upper-layer information reception unit 21, a PRS reception unit 22, a PRS replica generation unit 23, a propagation delay difference measurement unit 24, and a propagation delay difference transmission unit 25.

The upper-layer information reception unit 21 is configured to receive the lengths of the CPs used in the neighbouring cells #1 to #3, the cell IDs assigned to the neighbouring cells #1 to #3, the transmission timing differences among the neighbouring cells #1 to #3, and the like from the radio base station eNB.

For example, the upper-layer information reception unit 21 may also be configured to receive the lengths of the CPs used in the neighbouring cells #1 to #3, the cell IDs assigned to the neighbouring cells #1 to #3, the transmission timing differences among the neighbouring cells #1 to #3, and the like through the RRC message including the broadcast information, the mobile station UE-individual signaling, and the like.

The PRS reception unit 22 is configured to receive PRSs in the cells #1 to #3. Specifically, the PRS reception unit 22 is configured to receive the PRSs in the neighbouring cells #1 to #3 with reference to the above-mentioned Equations 1 to 4 and the like.

The PRS replica generation unit 23 is configured to generate PRS replicas in the neighbouring cells #1 to #3 by using the cell IDs of the neighbouring cells #1 to #3 and the lengths of the CPs used in the neighbouring cells #1 to #3, which are received in the upper-layer information reception unit 21. Specifically, the PRS replica generation unit 23 is configured to generate the PRS replicas in the neighbouring cells #1 to #3 with reference to the above-mentioned Equations 1 to 5 and the like.

The propagation delay difference measurement unit 24 is configured to detect PRSs in the neighbouring cells #1 to #3 based on the PRSs received in the PRS reception unit 22, and the PRS replicas in the neighbouring cells #1 to #3 generated by the PRS replica generation unit 23, and calculate propagation delay differences among the cells #1 to #3.

The propagation delay difference measurement unit 24 may also be configured to calculate a propagation delay difference between the serving cell #2 and the cell #1 and a propagation delay difference between the serving cell #2 and the cell #3.

In addition, the propagation delay difference measurement unit 24 may also be configured to measure a propagation delay difference between PRS of a cell, which can be detected with high accuracy, and the serving cell #2 by using PRS transmitted from another cell as well as PRS from a cell designated by the radio base station eNB. Here, when one or a plurality of reception levels of a received PRS, a reference signal common to cells, and a synchronization signal are equal to or more than a threshold value determined in advance, it may be possible to determine that the PRS can be detected with high accuracy.

Furthermore, the propagation delay difference measurement unit 24 is configured to transmit the measured propagation delay difference and PCI of the cell, for which the propagation delay difference has been measured, to the radio base station eNB.

(Operation of the Mobile Communication System According to The First Embodiment of the Present Invention)

Figure 5:
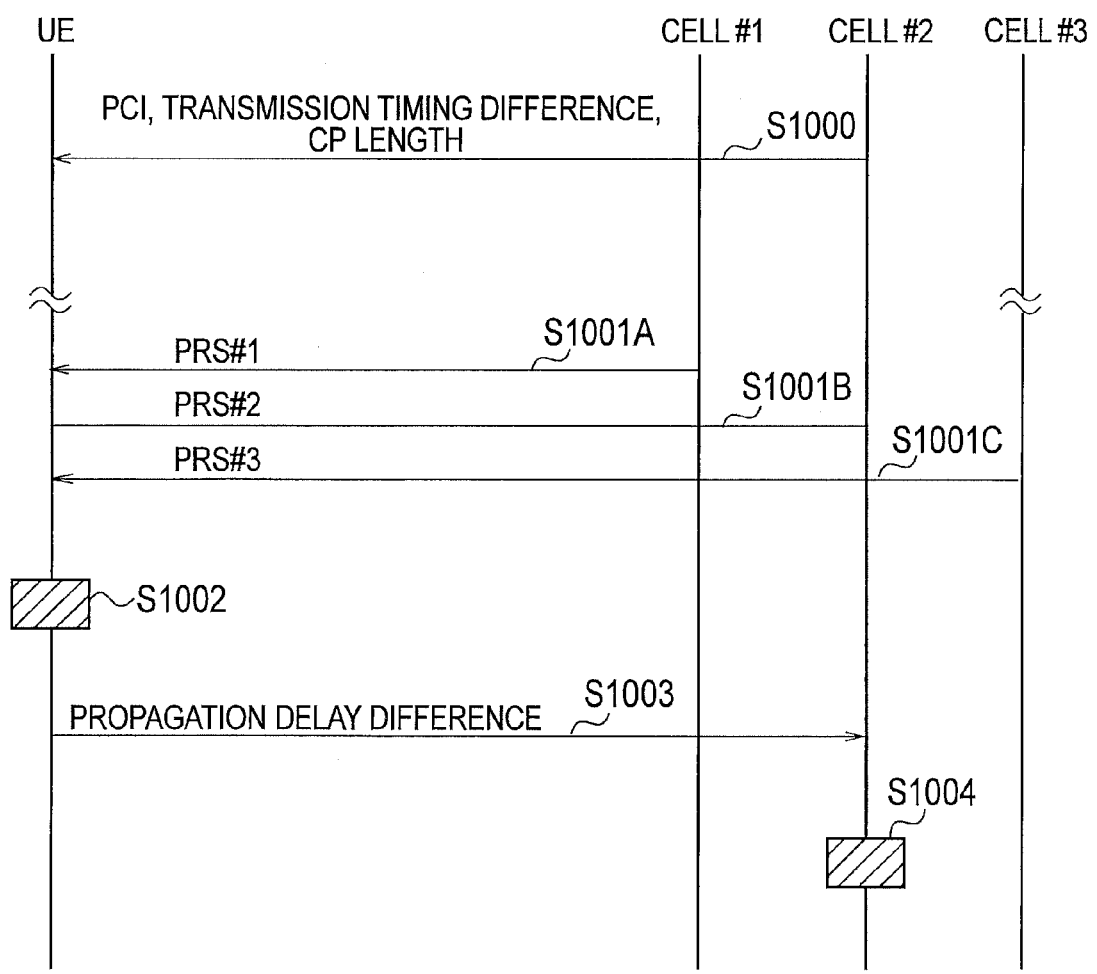
FIG. 5 is a sequence diagram illustrating an operation of the mobile communication system according to the first embodiment of the present invention.

With reference to FIG. 5, the operation of the mobile communication system according to the first embodiment of the present invention will be described.

As illustrated in FIG. 5, in step S1000, in the cell #2, the radio base station eNB transmits upper layer information including the cell IDs (for example, the PCIS) assigned to the cells #1 to #3, the lengths of the CPs used in the cells #1 to #3, the transmission timing difference between the cell #2 and the cell #1, and the transmission timing difference between the cell #2 and the cell #3.

The radio base station eNB transmits the PRS #1 in the cell #1 in step S1001A, transmits the PRS #2 in the cell #2 in step S1001B, and transmits the PRS #3 in the cell #3 in step S1001C. Here, steps S1001A to S1001C may also be performed before step S1000.

In step S1002, the mobile station UE receives the PRS #1 to the PRS #3, which have been transmitted in steps S1001A to S1001, based on the upper layer information transmitted in step S1000.

The mobile station UE measures a propagation delay difference between the cell #2, which is a serving cell of the mobile station UE, and the cell #1, and a propagation delay difference between the cell #2 and the cell #3 by using the received PRS #1 to PRS #3, and transmits the measured propagation delay differences between the cell #2 and the cell #1 and between the cell #2 and the cell #3 to the radio base station eNB via the cell #2 in step S1003.

In step S1004, the radio base station eNB transmits the propagation delay difference between the cell #2 and the cell #1 and the propagation delay difference between the cell #2 and the cell #3 to the E-SMLC.

(Operation and Effect of the Mobile Communication System According to the First Embodiment of the Present Invention)

In accordance with the mobile communication system according to the first embodiment of the present invention, it is possible for the mobile station UE to receive PRS by considering only one of the PRS transmission pattern for the "Normal CP" and the PRS transmission pattern for the "Extended CP" according to the length (that is, the "Normal CP" or the "Extended CP") of the CP transmitted by the radio base station eNB, thereby shortening a PRS reception processing time without causing complication in the configuration of the mobile station UE.

The characteristics of the present embodiment as described above may be expressed as follows.

A first characteristic of the present embodiment is summarized in that a radio base station eNB includes: the upper-layer information transmission unit 11 (a first transmission unit) configured to transmit the length of a cyclic prefix used in a neighbouring cell; and the PRS transmission unit 12 (a second transmission unit) configured to transmit PRS (a reference signal), which is generated based on the length of the cyclic prefix, in a subordinate cell when the subordinate cell is included in the neighbouring cell.

In the first characteristic of the present embodiment, the upper-layer information transmission unit 11 may also be configured to further transmit a cell ID (for example, PCI) assigned to the above-mentioned cell and transmission timing differences among cells.

A second characteristic of the present embodiment is summarized in that a mobile station UE includes: the upper-layer information reception unit 21 (a first reception unit) configured to receive the lengths of cyclic prefixes used in a plurality of cells; and the PRS reception unit 22 (a second reception unit) configured to receive PRSs transmitted in the plurality of cells based on the lengths of the cyclic prefixes.

In the second characteristic of the present embodiment, the upper-layer information reception unit 21 is configured to further receive PCIs assigned to the plurality of cells and transmission timing differences among cells, and the PRS reception unit 22 may also be configured to receive the PRSs transmitted in the plurality of cells based on the lengths of the cyclic prefixes, PCI, and the transmission timing differences among cells.

In the second characteristic of the present embodiment, the mobile station UE may also include: the propagation delay difference measurement unit 24 configured to measure propagation delay differences among the plurality of cells based on the PRS received in the plurality of cells; and the propagation delay difference transmission unit 25 configured to transmit the propagation delay differences among the plurality of cells.

A third characteristic of the present embodiment is summarized in that a measurement method, in which the mobile station UE measures transmission delay differences between a serving cell #2 of the mobile station UE and neighbouring cells #1 and #3 based on PRSs #1 to #3 received from the neighbouring cells #1 to #3, includes: a step of the radio base station eNB transmitting the lengths of CPs used in the neighbouring cells #1 to #3, cell IDs assigned to the neighbouring cells #1 to #3, and transmission timing differences between the serving cell #2 of the mobile station UE and the neighbouring cells #1 and #3; a step of, when a subordinate cell #2 is included in the neighbouring cells #1 to #3, the radio base station eNB transmitting PRS in the subordinate cell #2, the PRS being generated based on CP used in the subordinate cell #2; a step of the mobile station UE receiving the lengths of the CPs used in the neighbouring cells #1 to #3, the cell IDs assigned to the neighbouring cells #1 to #3, and the transmission timing differences between the serving cell #2 of the mobile station UE and the neighbouring cells #1 and #2; a step of the mobile station UE receiving PRSs transmitted by the neighbouring cells #1 to #3 based on the received lengths of the CPs, the cell IDs, and the transmission timing differences; a step of the mobile station UE measuring the propagation delay differences between the serving cell #2 of the mobile station UE and the neighbouring cells #1 and #3 based on the PRSs received from the neighbouring cells #1 to #3; and a step of the mobile station UE transmitting the measured propagation delay differences to the radio base station eNB.

It is noted that the operation of the radio base station eNB or the mobile station UE may be implemented by a hardware, may also be implemented by a software module executed by a processor, and may further be implemented by the combination of the both.

The software module may be arranged in a storage medium of an arbitrary format such as RAM(Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A radio base station used in a mobile communication system employing a Frequency Division Duplexing (FDD) scheme, comprising:
   a first transmission unit configured to transmit a length of a cyclic prefix used in a neighboring cell of a serving cell of a mobile station, and a transmission timing difference between the serving cell of the mobile station and the neighboring cell, to the mobile station, wherein the transmission timing difference indicates an interval between times when radio base stations transmit downlink reference signals to the mobile station; and
   a second transmission unit configured to transmit a reference signal in the neighboring cell, the reference signal being transmitted based on the length of the cyclic prefix and the transmission timing difference, wherein the length of the cyclic prefix and the transmission timing difference are notified to the mobile station by the first transmission unit.

2. A mobile station used in a mobile communication system employing a Frequency Division Duplexing (FDD) scheme, comprising:
   a first reception unit configured to receive a length of a cyclic prefix used in a neighboring cell of a serving cell of the mobile station, and a transmission timing difference between the serving cell of the mobile station and the neighboring cell, wherein the transmission timing difference indicates an interval between times when radio base stations transmit downlink reference signals to the mobile station; and
   a second reception unit configured to attempt to detect a reference signal, which is transmitted in the neighboring cell, based on the length of the cyclic prefix and the transmission timing difference, wherein the length of the cyclic prefix and the transmission timing difference are received from the radio base station by the first reception unit.

3. A mobile communication method in a mobile communication system employing a Frequency Division Duplexing (FDD) scheme, comprising:
   a step of a radio base station transmitting a length of a cyclic prefix used in a neighboring cell of a serving cell of a mobile station, and a transmission timing difference between the serving cell of the mobile station and the neighboring cell, to the mobile station, wherein the transmission timing difference indicates an interval between times when radio base stations transmit downlink reference signals to the mobile station;
   a step of the radio base station transmitting a reference signal in the neighboring cell, the reference signal being generated based on the length of the cyclic prefix and the transmission timing difference;
   a step of the mobile station receiving the length of the cyclic prefix and the transmission timing difference; and
   a step of the mobile station attempting to detect the reference signal, which is transmitted in the neighboring cell, based on the length of the cyclic prefix and the transmission timing difference, wherein the length of the cyclic prefix and the transmission timing difference are notified from the radio base station to the mobile station.

* * * * *